US010397898B2

(12) United States Patent
Chen et al.

(10) Patent No.: US 10,397,898 B2
(45) Date of Patent: Aug. 27, 2019

(54) BASE STATION AND CHANNEL SELECTION METHOD THEREOF

(71) Applicant: Institute For Information Industry, Taipei (TW)

(72) Inventors: Chiu-Wen Chen, Taipei (TW); Chun-Che Chien, Taipei (TW)

(73) Assignee: Institute For Information Industry, Taipei (TW)

( * ) Notice: Subject to any disclaimer, the term of this patent is extended or adjusted under 35 U.S.C. 154(b) by 439 days.

(21) Appl. No.: 15/009,564

(22) Filed: Jan. 28, 2016

(65) Prior Publication Data
US 2016/0227542 A1 Aug. 4, 2016

Related U.S. Application Data

(60) Provisional application No. 62/109,629, filed on Jan. 30, 2015.

(51) Int. Cl.
*H04W 72/00* (2009.01)
*H04W 28/18* (2009.01)
(Continued)

(52) U.S. Cl.
CPC ............ *H04W 72/00* (2013.01); *H04W 28/18* (2013.01); *H04W 28/26* (2013.01); *H04W 88/08* (2013.01)

(58) Field of Classification Search
CPC ..... H04W 72/00; H04W 28/18; H04W 28/26; H04W 88/08
See application file for complete search history.

(56) References Cited

U.S. PATENT DOCUMENTS 8,989,068 B1* 3/2015 Ramamurthy ........ H04W 72/02
370/310
9,007,938 B2* 4/2015 Sawai ..................... H04L 5/001
370/252
(Continued)

FOREIGN PATENT DOCUMENTS

CN 101848506 A 9/2010
CN 104247488 A 12/2014

OTHER PUBLICATIONS

Office Action to the corresponding Taiwan Patent Application rendered by the Taiwan Intellectual Property Office (TIPO) dated Dec. 27, 2016, 16 pages (including English translation).
(Continued)

*Primary Examiner* — Benjamin H Elliott, IV
*Assistant Examiner* — Brian P Cox
(74) *Attorney, Agent, or Firm* — Skaar Ulbrich Macari, P.A.

(57) ABSTRACT

A base station, user equipment, and channel selection method are provided. The base station can configure a Primary Component Carrier (PCC) and a plurality of Secondary Component Carriers (SCCs). The PCC is a Long Term Evolution (LTE) band, while at least one of the SCCs is not an LTE band. The base station receives a plurality of channel status parameters, wherein each of the channel status parameters corresponds to one of the SCCs. The base station sorts the SCCs according to the channel status parameters, determines a subset of the SCCs as at least one candidate SCC according to the channel status parameters, and determines a subset of the at least one candidate SCC as at least one available SCC by performing clear channel assessment for each of the at least one candidate SCC.

16 Claims, 4 Drawing Sheets

(51) Int. Cl.
*H04W 28/26* (2009.01)
*H04W 88/08* (2009.01)

(56) References Cited

U.S. PATENT DOCUMENTS

| | | | |
|---|---|---|---|
| 9,924,509 B2* | 3/2018 | Xu | ................ H04L 5/003 |
| 2007/0274280 A1 | 11/2007 | Haas et al. | |
| 2011/0019625 A1* | 1/2011 | Zhang | ................ H04W 52/365 |
| | | | 370/329 |
| 2014/0044105 A1 | 2/2014 | Bontu et al. | |
| 2014/0341035 A1 | 11/2014 | Bhushan et al. | |
| 2014/0369201 A1 | 12/2014 | Gupta et al. | |
| 2015/0049715 A1* | 2/2015 | Yerramalli | ............ H04L 5/1469 |
| | | | 370/329 |
| 2015/0071220 A1* | 3/2015 | Luo | ................ H04L 5/001 |
| | | | 370/329 |
| 2016/0234769 A1* | 8/2016 | Lidian | ................ H04W 48/20 |
| 2018/0145810 A1* | 5/2018 | Damnjanovic | ....... H04W 76/12 |

OTHER PUBLICATIONS

Office Action to the corresponding Chinese Patent Application No. 201610053839.0 rendered by the China National Intellectual Property Administration (CNIPA) dated Sep. 27, 2018, 20 pages (including English translation).

* cited by examiner

BASE STATION AND CHANNEL SELECTION METHOD THEREOF

PRIORITY

This application claims priority to U.S. Provisional Application No. 62/109,629 filed on Jan. 30, 2015, which is hereby incorporated by reference in its entirety.

FIELD

The present invention relates to a base station and a channel selection method. More particularly, the present invention relates to a base station and a channel selection method adopting the Licensed-Assisted Access (LAA) technology and/or the Licensed-Shared Access (LSA) technology.

BACKGROUND

Due to the limited bandwidth resources, the Long Term Evolution (LTE) standard provides the LAA technology and the LSA technology to integrate bandwidth resources of different heterogeneous network architectures.

When a wireless network system adopts the LAA technology, an available Primary Component Carrier (PCC) is a band licensed by the LTE, while available Secondary Component Carriers (SCCs) are other bands (e.g., Wi-Fi bands) not licensed by the LTE. When the wireless network system adopts the LSA technology, the available PCC is also a band licensed by the LTE, while the available SCCs are other licensed bands (e.g., bands for military use, or TV white bands).

Adopting either the LAA technology or the LSA technology, a base station has to access resources of bandwidth of the SCCs via the LTE technology. According to the conventional technology, if the SCC is a Wi-Fi band, the base station has to perform listen-before-talk (LBT) on the Wi-Fi band and perform Clear Channel Assessment (CCA). If the base station ensures that a band is idle during the process of performing CCA, the base station transmits a reservation signal on the band to reserve the resource of the band. In this way, the base station itself and/or a user equipment (UE) can transmit data on the band.

There are two kinds of conventional technologies for performing CCA. The first kind of technology is called the Frame Based Equipment (FBE). The FBE adopts fixed-length frames. That is, a CCA time interval of a fixed length is defined in the frame. The base station/equipment probes the SCC in this fixed CCA time interval. If an interference value probed by the base station on the SCC is smaller than a threshold, the base station can use the SCC. If the base station misses the CCA time interval, the base station has to wait until next CCA time interval, which results in an increased data transmission delay. Another kind of technology is called the Load Based Equipment (LBE), wherein the CCA time interval in the frame architecture used in the LBE is extendable. As this technology is based on the load, the number of CCA time intervals that a base station needs to probe is different. Specifically, the number of CCA time intervals in which the base station needs to probe increases as the load of the base station increases.

No matter which of the conventional technologies is used, it is the base station that performs the CCA and then notifies the UE of the band that is to be used. When several base stations instruct UEs (transmitting terminals) to use a same band to transmit data to other UEs (receiving terminals) within the same overlapped coverage, the so called Hidden Terminal problem will occur.

Accordingly, there is an urgent need for a channel selection technology that will not increase the delay time and will not cause the hidden terminal problem.

SUMMARY

The disclosure includes a base station. The base station in certain embodiments includes an overlapped coverage with at least one neighboring base station, wherein a plurality of user equipments (UEs) are located within the overlapped coverage. The base station is able to configure a Primary Component Carrier (PCC) and a plurality of Secondary Component Carriers (SCCs). The PCC is a Long Term Evolution (LTE) band, while at least one of the SCCs is not an LTE band. The base station comprises a transceiver and a processor, wherein the processor is electrically connected to the transceiver. The transceiver receives a plurality of channel status parameters, wherein each of the channel status parameters corresponds to one of the SCCs. The processor sorts the SCCs according to the channel status parameters so that the SCCs have an order. The processor determines a subset of the SCCs as at least one candidate SCC according to the channel status parameters. The processor determines a subset of the at least one candidate SCC as at least one available SCC by performing clear channel assessment (CCA) for each of the at least one candidate SCC according to the order.

The disclosure also includes a UE, wherein the UE is located within an overlapped coverage between a first base station and a second base station. The UE is able to monitor a PCC and at least one SCC. The PCC is an LTE band, while at least one of the at least one SCC is not an LTE band. The at least one SCC includes a first SCC. The UE in certain embodiments comprises a transceiver and a processor, wherein the processor is electrically connected to the transceiver. The processor instructs the transceiver to switch between the PCC and the at least one SCC. The transceiver measures a channel status parameter of the first SCC. The transceiver transmits the channel status parameter of the first SCC on one of the first SCC and the PCC. The transceiver learns that that the UE is allocated one of the at least one SCC from one of the PCC, the first SCC, and a narrow band. The transceiver transmits data to the first base station on the SCC allocated to the UE.

The disclosure further includes a channel selection method for a base station. The base station in certain embodiments includes an overlapped coverage with at least one neighboring base station, wherein a plurality of UEs are located within the overlapped coverage. The base station is able to configure a PCC and a plurality of SCCs. The PCC is a LTE band, while at least one of the SCCs is not an LTE band. The channel selection method comprises the following steps of: (a) receiving a plurality of channel status parameters, wherein each of the channel status parameters corresponds to one of the SCCs, (b) sorting the SCCs according to the channel status parameters so that the SCCs have an order, (c) determining a subset of the SCCs as at least one candidate SCC according to the channel status parameters, and (d) determining a subset of the at least one candidate SCC as at least one available SCC by performing CCA for each of the at least one candidate SCC according to the order.

The disclosure additionally includes a channel selection method for a UE. The UE is located within an overlapped coverage between a first base station and a second base station. The UE is able to monitor a PCC and at least one SCC, the PCC is an LTE band, and at least one of the at least one SCC is not an LTE band. The at least one SCC includes a first SCC. The channel selection method comprises the following steps of: (a) measuring a channel status parameter of the first SCC, (b) transmitting the channel status parameter of the first SCC on one of the first SCC and the PCC, (c) learning that the UE is allocated one of the at least one SCC from one of the PCC, the first SCC, and a narrow band, and (d) transmitting data to the first base station on the SCC allocated to the UE.

According to certain disclosed embodiments, the base station determines which SCCs may serve as the candidate SCCs according to the channel status parameters measured by the UEs and then determines which candidate SCCs are available SCCs by performing the CCA for each of the candidate SCCs during different time intervals. Since the base station makes the aforesaid determination with reference to the channel status parameters measured by the UEs, the hidden terminal problem can be avoided. Moreover, after determining a candidate SCC as an available SCC during a specified CCA time interval, the base station can transmit a reservation signal during a subsequent time interval to reserve the resource of the band so that the base station itself and/or the UE can transmit data on the band. In this way, the delay time in data transmission will not be increased.

The detailed technology and preferred embodiments implemented for the subject invention are described in the following paragraphs accompanying the appended drawings for people skilled in this field to well appreciate the features of the claimed invention.

DETAILED DESCRIPTION

In the following description, a base station, a user equipment, and a channel selection method will be explained with reference to example embodiments thereof. However, these example embodiments are not intended to limit the present invention to any specific examples, embodiments, environment, applications, or implementations described in these example embodiments. Therefore, description of these example embodiments is only for purpose of illustration rather than to limit the scope of the present invention. It shall be appreciated that elements unrelated to the present invention are omitted from depiction in the following embodiments and the attached drawings.

Figure 1A:
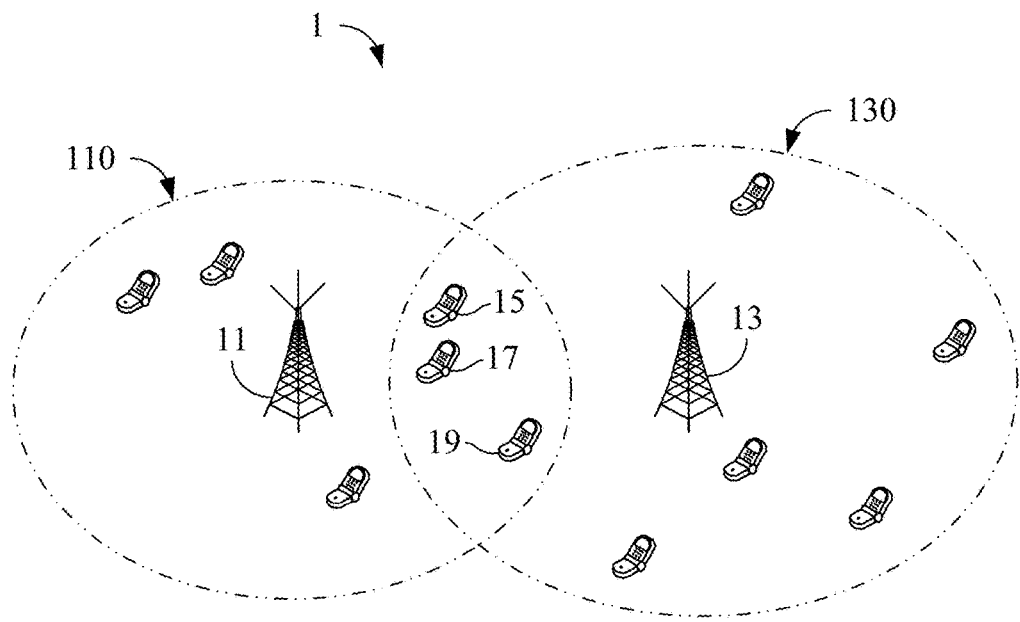
FIG. 1A illustrates a schematic view of a wireless network system 1 according to a first embodiment of the present invention.

A first embodiment of the present invention is a wireless network system 1 and a schematic view of which is depicted in FIG. 1A. The wireless network system 1 comprises two base stations 11 and 13 and a plurality of UEs. The base stations 11 and 13 are neighboring to each other, wherein the base station 11 has a signal coverage 110, the base station 13 has a signal coverage 130, and there is an overlapped coverage between the signal coverage 110 and the signal coverage 130 (i.e., an overlapped portion between the signal coverage 110 and the signal coverage 130). UEs 15, 17, and 19 are within the overlapped coverage. It shall be appreciated that, the number of base stations that may be comprised in a wireless network system and the number of UEs that can be served by a base station are not limited in the present invention. Moreover, it shall be appreciated by those of ordinary skill in the art that a UE is any mobile device capable of communicating with a base station.

Figure 1B:
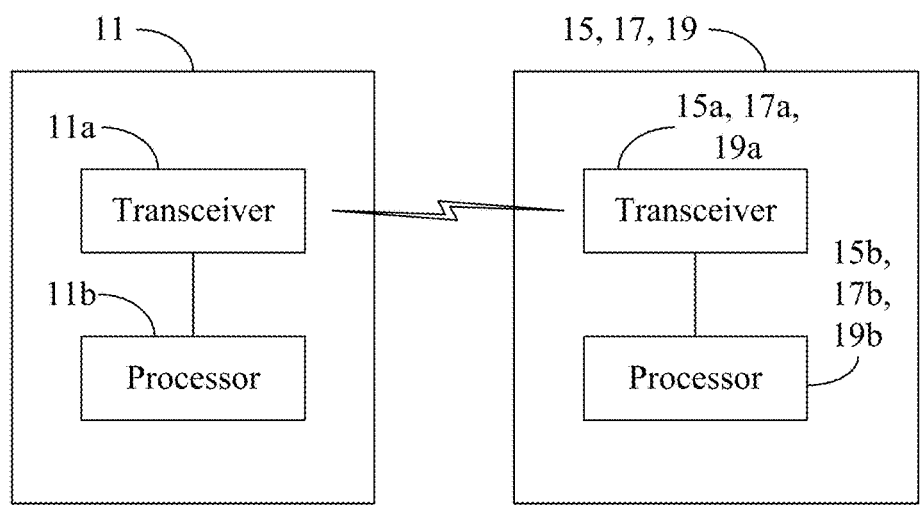
FIG. 1B illustrates a schematic view of the architecture of a base station 11 and user equipments (UEs) 15, 17 and 19.

In this embodiment, the base station 11 and the base station 13 may perform similar operations and, thus, only the operations performed by the base station 11 will be described in detail hereinafter. FIG. 1B illustrates the architecture of the base station 11 and the UEs 15, 17, and 19. The base station 11 comprises a transceiver 11a and a processor 11b, wherein the processor 11b is electrically connected to the transceiver 11a. The transceiver 11a may be any interface capable of communicating with a UE. The processor 11b may be any of various processors, central processing units (CPUs), microprocessors, or other computing apparatuses known to those of ordinary skill in the art. The UE 15 comprises a transceiver 15a and a processor 15b, wherein the processor 15b is electrically connected to the transceiver 15a. Similarly, the UE 17 comprises a transceiver 17a and a processor 17b, wherein the processor 17b is electrically connected to the transceiver 17a. Likewise, the UE 19 comprises a transceiver 19a and a processor 19b, wherein the processor 19b is electrically connected to the transceiver 19a. Each of the transceivers 15a, 17a, and 19a may be any interface capable of communicating with a base station. Each of the processors 15b, 17b and 19b may be any of various processors, CPUs, microprocessors, or other computing apparatuses known to those of ordinary skill in the art.

The base station 11 is able to configure a Primary Component Carrier (PCC) and a plurality of Secondary Component Carriers (SCCs). Each of the UEs 15, 17, and 19 is able to monitor the PCC and at least one of the SCCs. The PCC is a Long Term Evolution (LTE) band, while at least one of the SCCs is not an LTE band. Furthermore, when the wireless network system 1 adopts the Licensed-Assisted Access (LAA) technology under the LTE standard, the PCC is a band licensed by the LTE and each of the SCCs may be a band licensed by the LTE (which is different from the band used by the PCC) or a band not licensed by the LTE (e.g., a Wi-Fi band). When the wireless network system 1 adopts the Licensed-Shared Access (LSA) technology under the LTE standard, the PCC is a band licensed by the LTE and the SCCs may be bands licensed by the LTE (which are different from the band used by the PCC) or other licensed bands (e.g., bands for military use or TV white bands).

Figure 1C:
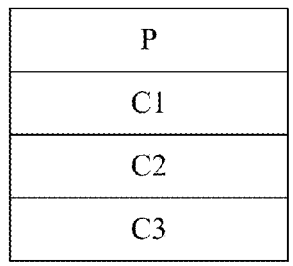
FIG. 1C illustrates a Primary Component Carrier (PCC) P and Secondary Component Carriers (SCC) C1, C2 and C3 that the base station 11 of the first embodiment is able to configure.

For convenience, it is assumed that the base station 11 of this embodiment is able to configure one primary component carrier P and three secondary component carriers C1, C2, and C3 as shown in FIG. 1C. It is also assumed that the UEs 15, 17 and 19 are all able to monitor the primary component carrier P and the secondary component carriers C1, C2, and C3. However, it shall be appreciated that the present invention does not require that the SCCs that the base station is able to configure and the SCCs that the UEs are able to monitor have to be the same. In addition, the present invention does not require that the SCCs that each UE is able to monitor have to be same. For example, in some embodiments of the present invention, the base station 11 is able to configure the secondary component carriers C1, C2, and C3, the UE 15 is able to monitor the secondary component carriers C1, C2, and C3, the UE 17 is able to monitor the secondary component carriers C2 and C3, and the UE 19 is able to monitor the secondary component carrier C3.

In this embodiment, which of the secondary component carriers C1, C2, and C3 are available SCCs will be decided through three stages. Briefly speaking, the first stage is the data collection stage, the second stage is the preliminary filtering stage, and the third stage is the clear channel selection stage. In the first stage, the base station 11 obtains channel status parameters of the UEs 15, 17, and 19. The base station 11 may even obtain user weights of the UEs 15, 17, and 19. In the second stage, the base station 11 determines which of the secondary component carriers C1, C2, and C3 may serve as the candidate SCCs for analysis in the next stage. In the third stage, the base station 11 performs the CCA for each of the candidate SCCs to determine which of the candidate SCCs are available SCCs. It shall be appreciated that some embodiments may further comprise a fourth stage, which is an allocation and transmission stage. In the fourth stage, the base station 11 allocates the available SCCs to the UEs for data transmission. Please refer to the following description for the specific operation of each of the stages.

First Stage: Data Collection Stage

As described above, in the first stage, the base station 11 obtains channel status parameters of the UEs 15, 17, and 19. In some embodiments, the base station 11 may even further obtain user weights of the UEs 15, 17, and 19.

The details regarding the base station 11 obtaining the channel status parameters of the UEs 15, 17 and 19 will be described herein. In this embodiment, the transceiver 15a of the UE 15 measures a channel status parameter of at least one of the secondary component carriers C1, C2, and C3 that the UE 15 is able to monitor. The transceiver 15a then transmits the channel status parameter to the base station 11 on the primary component carrier P or the measured SCC. During the aforesaid operation, the processor 15b instructs the transceiver 15a to switch between the PCC and the at least one SCC (if necessary). Similarly, the transceiver 17a of the UE 17 and the transceiver 19a of the UE 19 individually measure the channel status parameter of at least one of the secondary component carriers C1, C2, and C3 that the UE 17 or the UE 19 is able to monitor. The transceiver 17a and the transceiver 19a individually transmit the channel status parameter to the base station 11 on the primary component carrier P or the measured SCC. During the aforesaid operation, the processors 17b and 19b individually instruct the transceivers 17a and 19a to switch between the PCC and the at least one SCC (if necessary). It shall be additionally appreciated that the channel status parameter of an SCC is used to represent the communication status and/or the communication quality of the SCC. For example, the channel status parameter may be Channel Status Information (CSI), a Channel Quality Indicator (CQI), and/or a Quality Class Identity (QCI) of the SCC.

For ease of understanding, two specific examples are described hereby. In the first example, the transceiver 15a of the UE 15 measures the channel status parameter of the secondary component carrier C1 on the secondary component carrier C1, measures the channel status parameter of the secondary component carrier C2 on the secondary component carrier C2, and measures the channel status parameter of the secondary component carrier C3 on the secondary component carrier C3 and then transmits the channel status parameter of the secondary component carrier C1, the channel status parameter of the secondary component carrier C2, and the channel status parameter of the secondary component carrier C3 to the base station 11 on the primary component carrier P. If the UE 15 needs to upload data, the transceiver 15a also transmits an uplink transmission request when it transmits the channel status parameter on the primary component carrier P. In the second example, the transceiver 15a of the UE 15 measures the channel status parameter of the secondary component carrier C1 on the secondary component carrier C1 and then transmits the channel status parameter of the secondary component carrier C1 on the secondary component carrier C1. Moreover, the transceiver 15a of the UE 15 measures the channel status parameter of the secondary component carrier C2 on the secondary component carrier C2 and then transmits the channel status parameter of the secondary component carrier C2 on the secondary component carrier C2.

From the viewpoint of the base station 11, the transceiver 11a receives a plurality of channel status parameters and each of the channel status parameters corresponds to one of the secondary component carriers C1, C2, and C3. In this embodiment, the transceiver 11a of the base station 11 receives the channel status parameters of the secondary component carriers C1, C2, and C3 from the UEs 15, 17, and 19 within the overlapped coverage on the primary component carrier P. It shall be appreciated that the transceiver 11a of the base station 11 may receive the corresponding channel status parameter on each SCC (e.g., receive the channel status parameter of the secondary component carrier C1 on the secondary component carrier C1) in other embodiments.

Additionally, in some embodiments, the transceiver 11a of the base station 11 may first transmit an instruct signal to the UEs 15, 17, and 19 (or one or more of the UEs 15, 17, and 19) to instruct the UE for receiving the signal to transmit the channel status parameter that it has measured. Moreover, in some embodiments, the base station 11 may receive the channel status parameters from a base station neighboring to the base station 11 (e.g., the base station 13). For example, if the UEs 15, 17, and 19 have previously transmitted the channel status parameters to the base station 13, the base station 11 may receive the channel status parameters from the base station 13. Furthermore, in some embodiments, the base station 11 may receive the channel status parameters measured by the UEs 15, 17, and 19 from a serving database in a system adopting the LSA technology. According to the above description, from where and on which kind of carrier that the base station 11 receives the channel status parameters measured by the UEs 15, 17, and 19 are not limited in the present invention. It shall be additionally appreciated that the transceiver 11a may further transmit the channel status parameters to the serving database in a system adopting the LSA technology in some embodiments.

How the base station 11 obtains the user weights of the UEs 15, 17, and 19 will be described hereby. In some embodiments, for each SCC that the UE 15 is able to monitor, the transceiver 15a of the UE 15 transmits a carrier status of the SCC to the base station 11 on the SCC. The carrier status of one SCC may be an idle status or a busy status. Similarly, for each SCC that the UE 17 is able to monitor, the transceiver 17a of the UE 17 transmits a carrier status of the SCC to the base station 11 on the SCC. For each SCC that the UE 19 is able to monitor, the transceiver 19a of the UE 19 transmits a carrier status of the SCC to the base station 11 on the SCC. The transceiver 11a of the base station 11 receives the carrier statuses transmitted by the transceivers 15a, 17a, and 19a. The processor 11b of the base station 11 further calculates the user weight of each of the UEs 15, 17, and 19. Specifically, the processor 11b of the base station 11 calculates the number of idle SCCs that can be used by the UE 15 according to at least one carrier status transmitted by the UE 15. The user weight of the UE 15 is related to (e.g., the same as) the number of the idle SCCs that can be used by the UE 15.

In some embodiments, the transceiver 15a of the UE 15 may transmit the carrier statuses of all SCCs monitored by the UE 15 to the base station 11 on the primary component carrier P. Similarly, the transceiver 17a of the UE 17 transmits the carrier statuses of all SCCs monitored by the UE 17 to the base station 11 on the primary component carrier P. The transceiver 19a of the UE 19 transmits the carrier statuses of all SCCs monitored by the UE 19 to the base station 11 on the primary component carrier P. The transceiver 11a of the base station 11 receives the carrier statuses transmitted by the transceivers 15a, 17a, and 19a on the primary component carrier P. The processor 11b of the base station 11 then calculates the user weight of each of the UEs 15, 17, and 19.

In some embodiments, the user weight is calculated by the UE. Taking the UE 15 as an example, the UE 15 knows the carrier status of each SCC that the UE 15 is able to monitor. The processor 15b calculates the number of idle SCCs that can be used by the UE 15 according to the at least one carrier status. The user weight of the UE 15 is related to (e.g., the same as) the number of the idle SCCs that can be used by the UE 15. Next, the transceiver 15a of the UE 15 transmits the user weight thereof to the base station 11 through the primary component carrier P. Similarly, each the UEs 17 and 19 also transmits its user weight to the base station 11. The transceiver 11a of the base station 11 receives the user weights transmitted by the transceivers 15a, 17a, and 19a.

It shall be appreciated that, in some embodiments, each of the UEs 15, 17 and 19 may integrate the channel status parameter with the user weight before transmission (or integrate the channel status parameter with the carrier status before transmission) and then transmit the integrated data to the base station 11.

Second Stage: Preliminary Filtering Stage

After the base station 11 receives the channel status parameters, the processor 11b sorts the secondary component carriers C1, C2, and C3 according to the channel status parameters so that the secondary component carriers C1, C2, and C3 have a first order. For example, the processor 11b of the base station 11 may sort the SCCs in a way that an SCC having a better channel quality (e.g. having a higher channel status parameter) will have a higher priority. In some embodiments, the base station 11 may sort the secondary component carriers C1, C2, and C3 according to the channel status parameters and the user weights (if the base station 11 has obtained the user weights) so that the secondary component carriers C1, C2, and C3 have a first order. For ease of subsequent description, it is assumed that the secondary component carrier C1 precedes the secondary component carriers C2 and C3 and the secondary component carrier C2 precedes the secondary component carrier C3 according to the first order.

After the base station 11 receives the channel status parameters, the processor 11b determines a subset of the secondary component carriers C1, C2, and C3 as at least one candidate SCC (i.e., determines which SCC(s) can serve as the candidate SCC(s)) according to the channel status parameters. For example, each of the secondary component carriers C1, C2, and C3 may correspond to an interference threshold and the processor 11b of the base station 11 may determine whether an interference value of each of the secondary component carriers C1, C2, and C3 is smaller than the interference threshold corresponding to the SCC according to the channel status parameters. When the interference value of an SCC is smaller than the interference threshold corresponding to the SCC, the processor 11b of the base station 11 determines the SCC as a candidate SCC. As another example, the secondary component carriers C1, C2, and C3 may correspond to the same interference threshold. When the interference value of one of the SCCs is smaller than the interference threshold, the processor 11b of the base station 11 determines the SCC as a candidate SCC. For convenience, it is assumed that the processor 11b determines that the secondary component carriers C1, C2, and C3 are all candidate SCCs according to the channel status parameters.

Third Stage: Clear Channel Selection Stage

The processor 11b of the base station 11 determines a subset of the candidate SCCs as at least one available SCC (i.e., determines which candidate SCC(s) is/are the available SCC(s)) by performing clear channel assessment (CCA) for each of the candidate SCCs (i.e., each of the secondary component carriers C1, C2, and C3) according to the first order. Specifically, for a candidate SCC, if the processor 11b has performed the CCA on the candidate SCC for a required clear channel time period and/or successfully performs the CCA on the candidate SCC for a required number of times (i.e., the number of times that the clear channel is probed), the candidate SCC is an available SCC. For convenience, it is assumed that the processor 11b determines that the secondary component carriers C1, C2, and C3 are all available SCCs.

Various embodiments in which the base station 11 performs the CCA for each candidate SCC are described herein as examples. However, it is noted that these embodiments are not intended to limit the scope of the present invention.

In some embodiments, for each of the candidate SCCs, the processor 11b of the base station 11 has the same number of chances to perform CCA. Nevertheless, the actual number of times that the CCA is performed by the processor 11b for each of the candidate SCCs may not be the same. Please refer to FIG. 1D, which is taken as a specific example for description. In this specific example, the base station 11 performs the CCA for the secondary component carrier C1 on the secondary component carrier C1, performs the CCA for the secondary component carrier C2 on the secondary component carrier C2, and performs the CCA for the secondary component carrier C3 on the secondary component carrier C3. Within a fixed time length (e.g., a frame 10), the opportunity that the CCA is performed by the processor 11b for each of the candidate SCCs (i.e., each of the secondary component carriers C1, C2, and C3) is six times (i.e., the time intervals T1, T2, T3, T4, T5, and T6 in the frame 10). However, the number of times that the CCA is required to be successfully performed by the processor 11b is fewer (i.e., the required number of times that the clear channel is probed is fewer) for a candidate SCC of a higher priority level. For example, the number of times that the CCA is required to be successfully performed by the processor 11*b* on each of the secondary component carriers C1, C2, and C3 is respectively one time, two times, and three times.

Figure 1D:
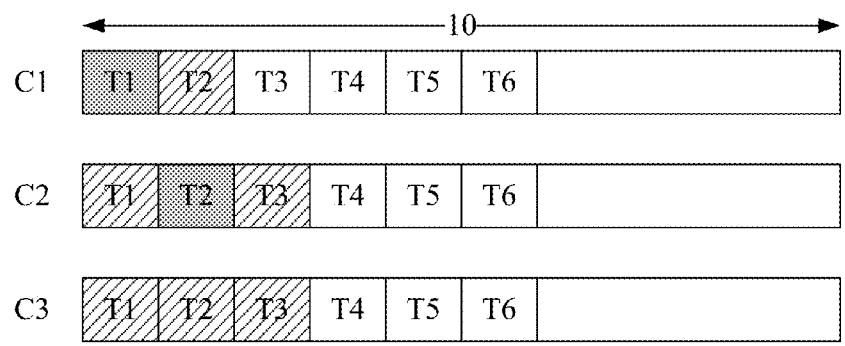
FIG. 1D illustrates a specific exemplary example in which the base station 11 performs clear channel assessment (CCA) for each candidate SCC and transmits data on an available SCC.

As shown in FIG. 1D, for the secondary component carrier C1, the processor 11*b* fails to successfully perform the CCA in the time interval T1 but successfully performs the CCA in the time interval T2 in this specific example. Since the CCA has been successfully performed for the required number of times (i.e., one time) for the secondary component carrier C1, the processor 11*b* will not perform the CCA for the secondary component carrier C1 in the time intervals T3, T4, T5, and T6. The processor 11*b* may immediately transmit a reservation signal in the subsequent time interval to reserve the resource of the band. After information (e.g., allocation information of the available SCCs) carried in the reservation signal is transmitted and/or after the reservation signal lasts to a frame edge, the base station and/or the UE that is allocated the secondary component carrier C1 can transmit data on the secondary component carrier C1. For the secondary component carrier C2, the processor 11*b* successfully performs the CCA in the time interval T1, fails to successfully perform the CCA in the time interval T2, and successfully performs the CCA in the time interval T3. Since the CCA has been successfully performed for the required number of times (i.e., two times) for the secondary component carrier C2, the processor 11*b* will not perform the CCA for the secondary component carrier C2 in the time intervals T4, T5, and T6. The processor 11*b* may immediately transmit a reservation signal in the subsequent time interval to reserve the resource of the band. After information (e.g., allocation information of the available SCCs) carried in the reservation signal is transmitted and/or after the reservation signal lasts to a frame edge, the base station and/or the UE allocated the secondary component carrier C2 can transmit data on the secondary component carrier C2. Furthermore, for the secondary component carrier C3, the processor 11*b* successfully performs the CCA in the time intervals T1, T2, and T3. Since the CCA has been successfully performed for the required number of times (i.e., three times) for the secondary component carrier C3, the processor 11*b* will not perform the CCA for the secondary component carrier C3 in the time intervals T4, T5, and T6. The processor 11*b* may immediately transmit a reservation signal in the subsequent time interval to reserve the resource of the band. After information (e.g., allocation information of the available SCCs) carried in the reservation signal is transmitted and/or after the reservation signal lasts to a frame edge, the base station and/or the UE allocated the secondary component carrier C3 can transmit data on the secondary component carrier C3.

In shall be appreciated that, in some embodiments, a start time at which the CCA is performed by the processor 11*b* of the base station 11 is not all the same for each of the candidate SCCs. Specifically, if the base station 11 is able to perform the CCA for several candidate SCCs at the same time, the start time at which the CCA is performed by the processor 11*b* may be the same for the candidate SCCs. However, if the base station 11 is unable to perform the CCA for several candidate SCCs at the same time, the start time at which the CCA is performed by the processor 11*b* is different for the candidate SCCs. If the start time at which the CCA is performed by the processor 11*b* of the base station 11 is not all the same for each of the candidate SCCs, the processor 11*b* of the base station 11 may decide the start time at which the CCA is performed for each of the candidate SCCs according to the first order (e.g., the start time is earlier for a candidate SCC of a higher priority level).

Figure 1E:
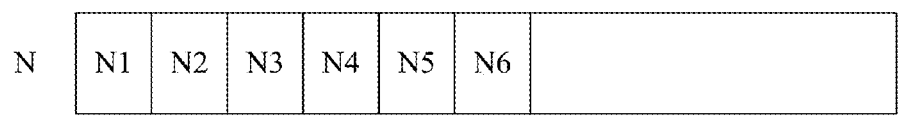
FIG. 1E illustrates a specific exemplary example in which the base station 11 performs the CCA for each candidate SCC on a narrow band and transmits data on an available SCC.

Moreover, in some embodiments, the processor 11*b* of the base station 11 performs the CCA for each of the candidate SCCs on a narrow band N as shown in FIG. 1E. The narrow band N defines a plurality of time intervals N1, N2, N3, N4, N5, and N6, wherein each of the time intervals N1, N2, N3, N4, N5, and N6 corresponds to one of the at least one candidate SCC. For example, the base station 11 may allocate more time intervals to the candidate SCC of a higher priority level according to the first order. As another example, the base station 11 may allocate the time interval of which the start time is earlier to the candidate SCC of a higher priority level according to the first order. For ease of understanding, it is assumed that the time intervals N1, N2, and N3 correspond to the secondary component carrier C1, the time intervals N4 and N5 correspond to the secondary component carrier C2, and the time interval N6 corresponds to the secondary component carrier C3. During each of the time intervals, the processor 11*b* of the base station 11 performs the CCA on the candidate SCC corresponding to the time interval. Similarly, for a candidate SCC, if the CCA has been successfully performed by the processor 11*b* for the required number of times (i.e., the number of times that the clear channel is probed), the candidate SCC is the available SCC.

Fourth Stage: Allocation and Transmission Stage

In some embodiments, after the processor 11*b* of the base station 11 has determined which candidate SCCs are available SCCs, the processor 11*b* allocates the available SCCs to the UEs. Various embodiments regarding the details that the base station 11 allocates the available SCCs to the UEs are described herein. However, these embodiments are not intended to limit the scope of the present invention.

As described above, the base station 11 obtains the user weights of the UEs 15, 17, and 19 in some embodiments. In those embodiments, the processor 11*b* of the base station 11 may sort the UEs 15, 17, and 19 according to the user weights so that the UEs 15, 17, and 19 have a second order. For convenience, it is assumed that the UE 15 precedes the UE 17, while the UE 17 precedes the UE 19 according to the second order. Thereafter, the processor 11*b* of the base station 11 allocates the at least one available SCC according to the second order. For example, a UE of a higher priority level will be allocated an available SCC more early. As another example, a UE of a higher priority level will be allocated an available SCC which is clearer (i.e., an available SCC of a higher priority level according to the second order).

In some embodiments, among the available secondary component carriers C1, C2, and C3, one of them (e.g., the available secondary component carriers C1) is one LTE band different from the PCC and the rest of them are not the LTE bands. Each of the UEs 15, 17, and 19 has a connection with the base station 11, wherein each of the connections has a Quality Class Identity (QCI). Specifically, when the base station 11 establishes a connection with a UE, it has the knowledge of a Quality of Service (QoS) of the UE. The processor 11*b* of the base station 11 decides the QCI of the connection according to the QoS. It is assumed that the QCI of the connection between the UE 15 and the base station 11 is higher than QCIs of other connections (i.e., the connection between the UE 17 and the base station 11 and the connection between the UE 19 and the base station 11). Since the QCI of the connection between the UE 15 and the base station 11 is higher than the QCIs of other connections, the processor 11*b* of the base station 11 allocates the available secondary component carrier C1 to the connection between the UE 15 and the base station 11. The transceiver 11a of the base station 11 notifies the UE 15 to use the secondary component carrier C1 through the primary component carrier P. Additionally, the processor 11b of the base station 11 allocates the available secondary component carrier C2 to the connection between the UE 17 and the base station 11 and allocates the available secondary component carrier C3 to the connection between the UE 19 and the base station 11. The transceiver 11a of the base station 11 may notify the UE 17 to use the secondary component carrier C2 through the primary component carrier P, the secondary component carrier C2, or the narrow band N (if the CCA is previously performed on the narrow band N). The transceiver 11a may notify the UE 19 to use the secondary component carrier C3 through the primary component carrier P, the secondary component carrier C3, or the narrow band N (if the CCA is previously performed on the narrow band N).

In some embodiments, each of the available secondary component carriers C1 and C2 is an LTE band different from the PCC and the available secondary component carrier C3 is not an LTE band. Each of the UEs 15, 17, and 19 has a connection with the base station 11, wherein each of the connections has a QCI. It is assumed that the QCI of the connection between the UE 19 and the base station 11 is lower than QCIs of other connections (i.e., the connection between the UE 15 and the base station 11 and the connection between the UE 17 and the base station 11). The processor 11b of the base station 11 allocates the available secondary component carrier C3 to the connection between the UE 19 and the base station 11, allocates the available secondary component carrier C1 to the connection between the UE 15 and the base station 11, and allocates the available secondary component carrier C2 to the connection between the UE 17 and the base station 11. Similarly, the transceiver 11a of the base station 11 may notify the UE 19 to use the secondary component carrier C3 through the primary component carrier P, the secondary component carrier C3, or the narrow band N (if the CCA is previously performed on the narrow band N). Additionally, the transceiver 11a of the base station 11 notifies the UE 15 to use the secondary component carrier C1 through the primary component carrier P and notifies the UE 17 to use the secondary component carrier C2 through the primary component carrier P.

In some embodiments, none of the available secondary component carriers C1, C2, and C3 is an LTE band. According to the first order, the priority level of the available secondary component carrier C1 is higher than that of the available secondary component carrier C2 and the priority level of the available secondary component carrier C2 is higher than that of the available secondary component carrier C3. According to the second order, the UE 15 precedes the UE 17 (i.e., the user weight of the UE 15 is higher) and the UE 17 precedes the UE 19. Therefore, the processor 11b of the base station allocates the available secondary component carrier C1 to the UE 15, allocates the available secondary component carrier C2 to the UE 17, and allocates the available secondary component carrier C3 to the UE 19. Similarly, the transceiver 11a of the base station 11 may notify the UE 15 to use the secondary component carrier C1 through the primary component carrier P, the secondary component carrier C1, or the narrow band N (if the CCA is previously performed on the narrow band N). The transceiver 11a may notify the UE 17 to use the secondary component carrier C2 through the primary component carrier P, the secondary component carrier C2, or the narrow band N (if the CCA is previously performed on the narrow band N). The transceiver 11a may notify the UE 19 to use the secondary component carrier C3 through the primary component carrier P, the secondary component carrier C3, or the narrow band N (if the CCA is previously performed on the narrow band N).

As described above, the base station 11 may notify the UE to use the available SCC allocated to the UE through the primary component carrier P, the available SCC, or the narrow band N. How the base station 11 notifies the UEs and in which cases the primary component carrier P, the available SCC or the narrow band N will be adopted are further described hereby.

As described above, in some embodiments, the processor 11b of the base station 11 performs the CCA on each candidate SCC. In those embodiments, after the base station 11 has determined a certain candidate SCC as an available SCC and has determined to allocate the available SCC to which UE, the transceiver 11a can transmit a reservation signal on the available SCC. The reservation signal may carry allocation information which indicates to which UE (e.g., the UE 15) the available SCC is allocated. If the reservation signal carries the allocation information, the UE (e.g., the UE 15) which has been allocated the available SCC can upload data on the available SCC after the reservation signal is probed by the UE on the available SCC. In some embodiments, the transceiver 11a of the base station 11 transmits a schedule message on the primary component carrier P to notify the UE to use the available SCC allocated to the UE. The aforesaid schedule message indicates which available SCC(s) is/are allocated to which UE(s).

The embodiments described above will now be described from the perspective of the UEs. There are two main cases for the UE that is to upload data. In the first case, after transmitting the channel status parameters, the UE stays on the primary component carrier P and waits for the notification of the base station 11. When the transceiver of the UE receives the schedule message transmitted by the transceiver 11a of the base station 11, the UE can learn the available SCC allocated to the UE. In the second case, after transmitting the channel status parameters, the UE stays on a certain SCC to probe the reservation signal. If the reservation signal carries allocation information, then the UE can learn the available SCC allocated to the UE from the allocation information. If the reservation signal does not carry allocation information, the UE may switch to the primary component carrier P to wait for the schedule message transmitted by the base station 11.

As described above, in some embodiments, the processor 11b of the base station 11 performs the CCA for each candidate SCC on the narrow band N. In those embodiments, the transceiver 11a of the base station 11 transmits a correspondence relationship between the time intervals N1, N2, N3, N4, N5, and N6 and the candidate secondary component carriers C1, C2, and C3 to the UEs 15, 17, and 19 on the primary component carrier P. For a certain candidate SCC, after the base station 11 has determined the candidate SCC as an available SCC and has determined to allocate the available SCC to which UE, the transceiver 11a of the base station 11 transmits a busy tone during the time interval corresponding to the available SCC and the transceiver 11a transmits a reservation signal on the available SCC. In some embodiments, the reservation signal carries allocation information which indicates to which UE the available SCC is allocated. If the reservation signal carries the allocation information, the UE that has been allocated the available SCC can upload data on the available SCC after the reservation signal is probed by the UE on the available SCC. In some embodiments, the transceiver 11a of the base station 11 transmits a schedule message on the primary component carrier P and the schedule message indicates which available SCC(s) is/are allocated to which UE(s).

The embodiments described above will now be described from the perspective of the UEs. There are two main cases for the UE that is to upload data. In the first case, after transmitting the channel status parameters, the UE stays on the primary component carrier P and waits for the notification of the base station 11. When the transceiver of the UE receives the schedule message transmitted by the transceiver 11a of the base station 11, the UE can know the available SCC allocated to the UE. In the second case, after transmitting the channel status parameters, the UE stays on the narrow band to probe the busy tone. In some embodiments, after the busy tone is probed on the narrow band during a certain time interval by the UE, the UE switches to the primary component carrier P to wait for the schedule message transmitted by the base station 11. In some embodiments, after the busy tone is probed on the narrow band during a certain time interval by the UE, the UE switches to the SCC corresponding to the time interval to probe the reservation signal. The UE knows the available SCC allocated to it from allocation information carried by the reservation signal.

Next, the time instant at which the UE transmits data on the available SCC will be described. In this embodiment, after the base station 11 has determined which candidate SCC is an available SCC and has determined to allocate the available SCC to which UE, the base station 11 can transmit a reservation signal in the subsequent time interval to reserve the resource of the band so that the base station itself and/or the UE transmits data on the available SCC.

Taking FIG. 1D as an example, it is assumed that the base station 11 allocates the secondary component carriers C1, C2, and C3 respectively to the UEs 15, 17, and 19. As described above, the base station 11 determines the secondary component carrier C1 as the available SCC in the time interval T2, so the base station 11 can transmit the reservation signal in the subsequent time interval on the secondary component carrier C1 to reserve the band resource. After information (e.g., allocation information of the available SCCs) carried in the reservation signal is transmitted and/or after the reservation signal lasts to a frame edge, the base station 11 and/or the UE 15 can transmit data on the secondary component carrier C1. The base station 11 performs the same operation for the secondary component carriers C2 and C3, and thus this will not be further described herein.

FIG. 1E is taken as another example. It is assumed that the base station 11 determines the candidate secondary component carrier C1 as the available SCC in the time interval N3 and the secondary component carrier C1 is allocated to the UE 15, the base station 11 may further transmit the reservation signal on the secondary component carrier C1 in the subsequent time interval to reserve the band resource in addition to transmitting the busy tone on the narrow band in the time interval N3. After information (e.g., allocation information of the available SCCs) carried in the reservation signal is transmitted and/or after the reservation signal lasts to a frame edge, the base station 11 and/or the UE 15 can transmit data on the secondary component carrier C1. The base station 11 performs the same operation for the secondary component carriers C2 and C3, and thus this will not be further described herein.

According to the above description, the base station 11 determines which SCCs may serve as the candidate SCCs according to the channel status parameters measured by the UEs, and then determines which candidate SCCs are available SCCs by performing the CCA for each of the candidate SCCs in different time intervals. Since the base station 11 makes the aforesaid determination by reference to the channel status parameters measured by the UEs, the hidden terminal problem is avoided. Moreover, after determining a candidate SCC as an available SCC in a specified time interval, the base station 11 transmits a reservation signal to reserve the resource of the available SCC so that the base station 11 and/or the UE can transmit data during a subsequent time interval, and thus the delay time in data transmission will not be increased.

Figure 2:
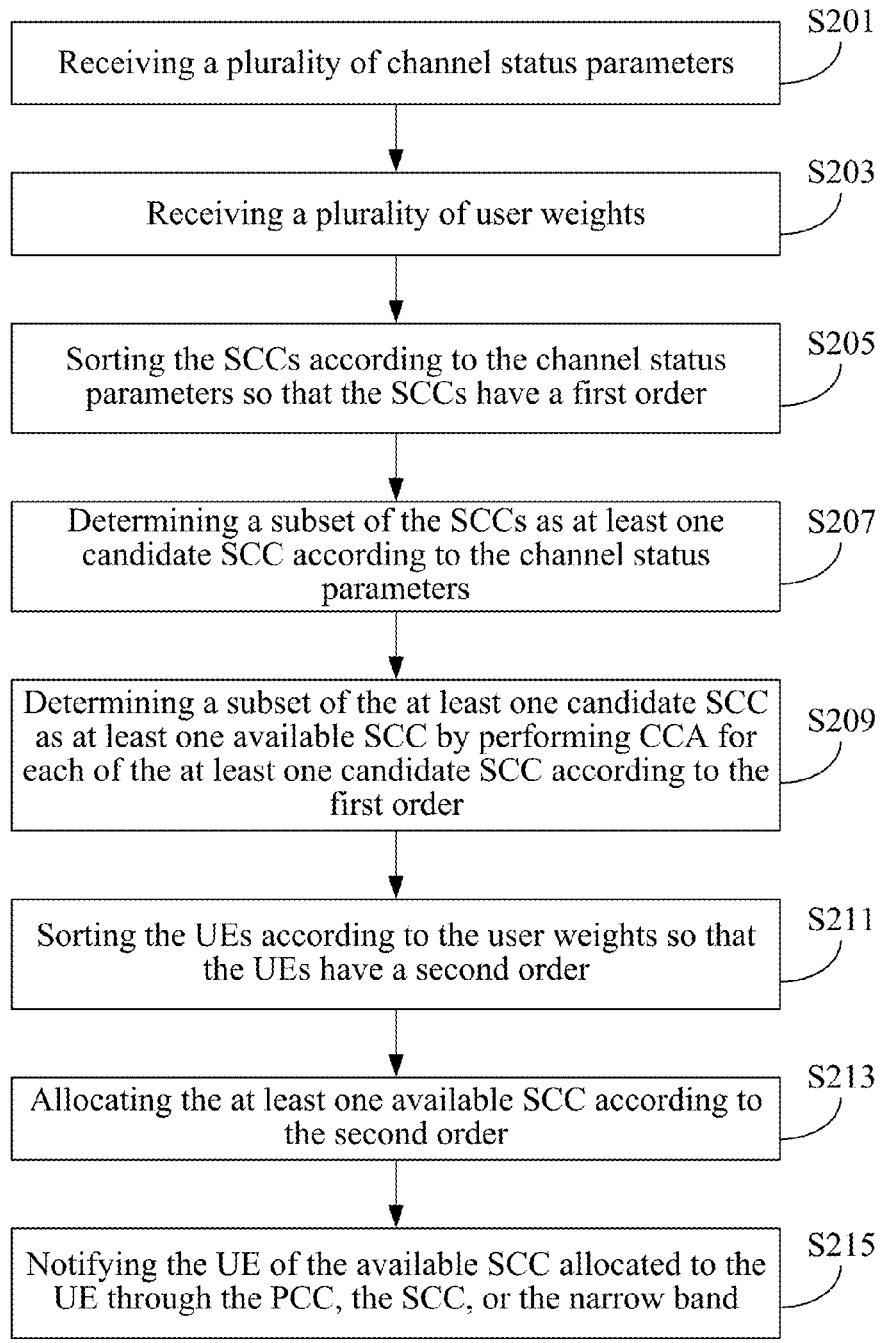
FIG. 2 illustrates a flowchart of a second embodiment of the present invention.

A second embodiment of the present invention is a channel selection method and a flowchart of the method is depicted in FIG. 2. The channel selection method is for use in a base station (e.g., the base station 11 of the first embodiment) in a wireless network system. The base station has an overlapped coverage with at least one neighboring base station (e.g., the base station 13 of the first embodiment). The overlapped coverage is the overlapped portion between the signal coverage of the base station and the signal coverage of the neighboring base station. A plurality of UEs are located within the overlapped coverage.

The base station is able to configure a PCC and a plurality of SCCs, wherein the PCC is a first LTE band and at least one of the SCCs is not an LTE band. It shall be appreciated that when the wireless network system adopts the LAA technology under the LTE standard, the PCC is a band licensed by the LTE and each of the SCCs may be a band licensed by the LTE (which is different from the band used by the PCC) or a band not licensed by the LTE (e.g., a Wi-Fi band). When the wireless network system 1 adopts the LSA technology under the LTE standard, the PCC is a band licensed by the LTE and the SCCs may be bands licensed by the LTE (which are different from the band used by the PCC) or other licensed bands (e.g., bands for military use or TV white bands).

First, step S201 is executed to receive by the base station a plurality of channel status parameters, wherein each of the channel status parameters corresponds to one of the UEs and one of the SCCs. It shall be appreciated that the step S201 receives the channel status parameters by the base station from the UEs through the PCC in some embodiments. Yet in some embodiments, the step S201 receives the channel status parameters on each SCC by the base station. In some embodiments, another step may first be executed in the channel selection method to transmit an instruction signal to each of the UEs by the base station (not shown) and then the step S201 is executed to receive the channel status parameters by the base station from the UEs through the PCC. Moreover, in some embodiments, the step S201 may be executed to receive the channel status parameters from a serving database in a system adopting the LSA technology. It shall be additionally appreciated that, in some embodiments, another step may be executed after the step S201 in the channel selection method to transmit by the base station the channel status parameters to the serving database in a system adopting the LSA technology (not shown).

Next, step S203 is executed to receive by the base station a plurality of user weights each of which corresponds to one of the UEs. It shall be appreciated that, in some embodiments, the step S203 may be replaced by a step of receiving a plurality of carrier statuses and a step of calculating the user weights of the UEs according to the carrier statuses.

Each of the carrier statuses corresponds to a UE (i.e., is transmitted by a certain UE) and represents a use status of a certain SCC, e.g., an idle status or a busy status. For each UE, the base station calculates the user weight of the UE according to the carrier status transmitted by the UE. It shall be appreciated that, the step S203 may be omitted in some embodiments.

It shall be appreciated that, in some embodiments, the step S201 and the step S203 may be executed together (i.e., the data received by the base station comprises both the channel status parameters and the user weights, or comprises both the channel status parameters and the carrier statuses).

In step S205, the SCCs are sorted by the base station according to the channel status parameters so that the SCCs have a first order. Thereafter, in step S207, a subset of the SCCs is determined as at least one candidate SCC by the base station according to the channel status parameters (i.e., it is determined which SCC(s) may serve as the candidate SCC(s)).

Next, in step S209, a subset of the at least one candidate SCC is determined by the base station as at least one available SCC by performing CCA for each of the at least one candidate SCC according to the first order. Specifically, for a candidate SCC, if the base station performs the CCA on the candidate SCC for a required clear channel time period and/or successfully performs the CCA on the candidate SCC for a required number of times (i.e., the number of times that the clear channel is probed), then the candidate SCC is an available SCC.

In some embodiments, in the step S209, the number of times that the CCA is performed is not all the same for each of the at least one candidate SCC. For example, in the step S209, a candidate SCC of a higher priority level (according to the first order) may be given more opportunities to have the CCA performed thereon. As another example, the required number of times that the CCA is successfully performed may be fewer for a candidate SCC of a higher priority level.

In some embodiments, in the step S209, a start time at which the CCA is performed is not all the same for each of the candidate SCCs. Specifically, if the base station is unable to perform the CCA for several candidate SCCs at the same time, the start time at which the CCA is performed is different for the candidate SCCs in the step S209. For example, the start time at which the CCA is performed for each of the candidate SCCs may be decided according to the first order (e.g., the start time is earlier for a candidate SCC of a higher priority level) in the step S209.

In some embodiments, in the step S209, the CCA may be performed for the candidate SCCs on a narrow band. Specifically, the narrow band defines a plurality of time intervals, wherein each of the time intervals corresponds to one of the at least one candidate SCC. The step S209 performs the CCA for the candidate SCC corresponding to the time interval during each of the time intervals. It shall be appreciated that, in those embodiments, another step is executed in the channel selection method to transmit a correspondence relationship between the time intervals and the at least one candidate SCC to each of the UEs.

Thereafter, in step S211, the UEs are sorted by the base station according to the user weights so that the UEs have a second order. In step S213, the at least one available SCC is allocated by the base station according to the second order. In step S215, the base station notifies the UE of the available SCC allocated to the UE through the PCC, the SCC, or the narrow band. It shall be appreciated that, for embodiments in which the step S203 is omitted, the step S211 is also omitted, and the at least one available SCC is not allocated according to the second order in the step S213.

In some embodiments, the at least one available SCC includes a first available SCC and a second available SCC. The first available SCC is an LTE band different from the PCC, while the second available SCC is not an LTE band. Each of the UEs has a connection with the base station, wherein each of the connections has a Quality Class Identity (QCI). The QCI of a first connection among the connections is higher than QCIs of other connections. The QCI of a second connection among the connections is lower than QCIs of other connections. The step S213 allocates the first available SCC to the first connection and allocates the second available SCC to the second connection. In those embodiments, the step S215 notifies the UE corresponding to the first connection to use the first available SCC through the PCC and notifies the UE corresponding to the second connection to use the second available SCC through the PCC, the second available SCC, or the narrow band.

In some embodiments, the at least one available SCC includes a first available SCC and a second available SCC. The first available SCC and the second available SCC are not LTE bands. The first available SCC has a priority level higher than that of the second available SCC. Each of the UEs has a user weight, wherein the user weight of a first UE among the UEs is higher than those of other UEs and the user weight of a second UE among the UEs is lower than those of other UEs. The step S213 allocates the first available SCC to the first UE and allocates the second available SCC to the second UE. In those embodiments, the step S215 notifies the first UE to use the first available SCC (e.g., through the PCC, the first available SCC, or the narrow band) and notify the second UE to use the second available SCC (e.g., through the PCC, the second available SCC, or the narrow band).

It shall be appreciated that if the CCA is performed for the candidate SCCs on the narrow band in the step S209, the step S215 transmits a busy tone during the time interval corresponding to each of the at least one available SCC and transmits a reservation signal on each of the at least one available SCC.

In addition to the aforesaid steps, the second embodiment can also execute all the operations and steps of the base station set forth in the first embodiment, have the same functions, and deliver the same technical effects as the first embodiment. How the second embodiment executes these operations and steps, has the same functions, and delivers the same technical effects as the first embodiment will be readily appreciated by those of ordinary skill in the art based on the explanation of the first embodiment, and thus will not be further described herein.

Figure 3:
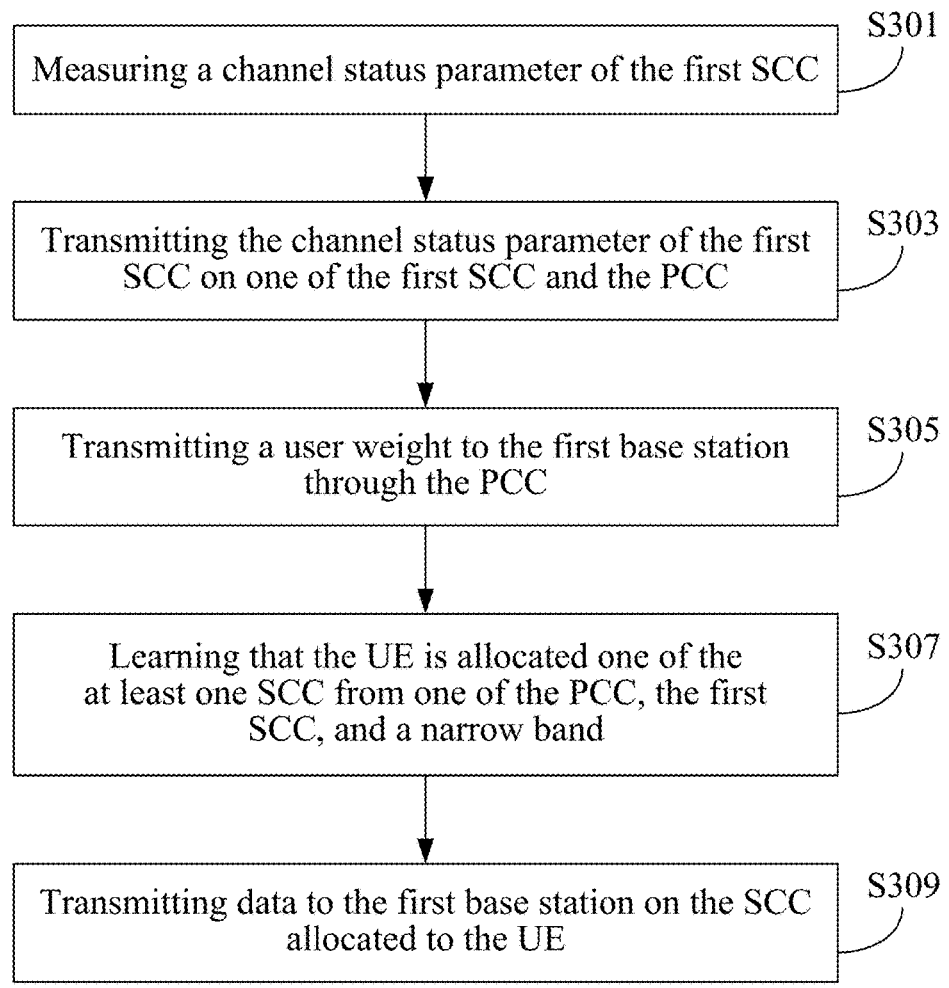
FIG. 3 illustrates a flowchart of a third embodiment of the present invention.

A third embodiment of the present invention is a channel selection method, wherein a flowchart of the method is depicted in FIG. 3. The channel selection method is for use in a UE (e.g., the UE 15 of the first embodiment) in a wireless network system. The UE is located within an overlapped coverage between a first base station and a second base station. The UE is able to monitor a PCC and at least one SCC. The PCC is an LTE band, at least one of the at least one SCC is not an LTE band, and the at least one SCC includes a first SCC.

First, step S301 is executed to measure a channel status parameter of the first SCC by the UE. Next, step S303 is executed to transmit the channel status parameter of the first SCC by the UE on one of the first SCC and the PCC. It shall be appreciated that if the step S303 transmits the channel status parameter of the first SCC on the PCC, another step (not shown) may be further executed in the embodiment to transmit an uplink transmission request by the UE on the PCC.

Then, step S305 is executed to transmit a user weight to the first base station through the PCC by the UE, wherein the user weight is related to the number of idle SCCs among the at least one SCC. It shall be appreciated that, in some embodiments, the step S305 may be replaced by another step of transmitting a carrier status by the UE on each of the at least one SCC, and the carrier status is one of an idle status and a busy status. In some embodiments, the step S303 and the step S305 may be executed together (i.e., the UE may integrate the channel status parameter with the user weight before transmission or integrate the channel status parameter with the carrier status before transmission and then transmit the integrated data to the first base station).

Next, step S307 is executed to know from one of the PCC, the first SCC, and a narrow band by the UE that the UE is allocated one of the at least one SCC. Thereafter, step S309 is executed to transmit data to the first base station by the UE on the SCC allocated to the UE.

In addition to the aforesaid steps, the third embodiment can also execute all the operations and steps of the UE set forth in the first embodiment, have the same functions, and deliver the same technical effects as the first embodiment. How the third embodiment executes these operations and steps, has the same functions, and delivers the same technical effects as the first embodiment will be readily appreciated by those of ordinary skill in the art based on the explanation of the first embodiment, and thus will not be further described herein.

It shall be appreciated that in the specification and the claims of the present invention, the terms "first" and "second" used in the "first order" and the "second order" are only intended to distinguish these orders from each other.

According to the above descriptions, the base station provided by the present invention determines which SCCs may serve as the candidate SCCs according to the channel status parameters measured by the UEs, and then determines which candidate SCCs are available SCCs by performing the CCA for each of the candidate SCCs in different time intervals. Since the base station makes the aforementioned determination by reference to the channel status parameters measured by the UEs, the hidden terminal problem is avoided. Moreover, after determining a candidate SCC as an available SCC in a specified CCA time interval, the base station can transmit a reservation signal during a subsequent time interval to reserve the band resource of the available SCC so that the base station itself and/or the UE can transmit data on the band. Therefore, the delay time in data transmission will not be increased.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A base station, having an overlapped coverage with at least one neighboring base station, a plurality of user equipments (UEs) being located within the overlapped coverage, the base station being able to configure a Primary Component Carrier (PCC) and a plurality of Secondary Component Carriers (SCCs), the PCC being a first Long Term Evolution (LTE) band, and at least one of the SCCs being not an LTE band, the base station comprising:
a transceiver, being configured to receive a plurality of channel status parameters from the UEs, each of the channel status parameters corresponds to one of the SCCs; and
a processor, being electrically connected to the transceiver and configured to sort the SCCs according to the channel status parameters so that the SCCs have a first order, determine a subset of the SCCs as at least one candidate SCC according to the channel status parameters, determine a subset of the at least one candidate SCC as at least one available SCC by performing clear channel assessment (CCA) for each of the at least one candidate SCC according to the first order, and allocate the at least one available SCC to at least one of the UEs;
wherein the candidate SCC with a higher priority level according to the first order requires a fewer number of times of successfully performed CCA to become one of the at least one available SCC.

2. The base station of claim 1, wherein the transceiver further receives a plurality of user weights, each of the user weights corresponds to one of the UEs, the processor further sorts the UEs according to the user weights so that the UEs have a second order, and the processor further allocates the at least one available SCC according to the second order.

3. The base station of claim 1, wherein the number of times that CCA is performed for each of the at least one candidate SCC by the processor is not all the same.

4. The base station of claim 1, wherein a start time for performing CCA for each of the at least one candidate SCC by the processor is not all the same.

5. The base station of claim 1, wherein a narrow band defines a plurality of time intervals, each of the time intervals corresponds to one of the at least one candidate SCCs, and during each of the time intervals, the processor performs CCA for the candidate SCC corresponding to the time interval.

6. The base station of claim 5, wherein the transceiver further transmits a correspondence relationship between the time intervals and the at least one candidate SCC to each of the UEs, wherein for each of the at least one available SCC, the transceiver further transmits a busy tone during the time interval corresponding to the available SCC, and the transceiver further transmits a reservation signal on each of the at least one available SCC.

7. The base station of claim 1, wherein the at least one available SCC includes a first available SCC and a second available SCC, the first available SCC is a second LTE band, the second available SCC is not an LTE band, each of the UEs has a connection with the base station, each of the connections has a Quality Class Identity (QCI), the QCI of a first connection among the connections is higher than the QCIs of other connections, the processor further allocates the first available SCC to the first connection, the transceiver further notifies the UE corresponding to the first connection to use the first available SCC, the QCI of a second connection among the connections is lower than the QCIs of other connections, the processor further allocates the second available SCC to the second connection, and the transceiver further notifies the UE corresponding to the second connection to use the second available SCC.

8. The base station of claim 1, wherein the at least one available SCC includes a first available SCC and a second available SCC, the first available SCC and the second available SCC are not LTE bands, the first available SCC has a priority level higher than that of the second available SCC, each of the UEs has a user weight, the user weight of a first UE among the UEs is higher than other user weights, the processor further allocates the first available SCC to the first UE, the transceiver further notifies the first UE to use the first available SCC, the user weight of a second UE among the UEs is lower than other user weights, the processor further allocates the second available SCC to the second UE, and the transceiver further notifies the second UE to use the second available SCC.

9. A channel selection method for a base station, the base station having an overlapped coverage with at least one neighboring base station, a plurality of UEs being located within the overlapped coverage, the base station being able to configure a PCC and a plurality of SCCs, the PCC being a first LTE band, and at least one of the SCCs being not an LTE band, and the channel selection method comprising:
 (a) receiving a plurality of channel status parameters from the UEs, wherein each of the channel status parameters corresponds to one of the SCCs;
 (b) sorting the SCCs according to the channel status parameters so that the SCCs have a first order;
 (c) determining a subset of the SCCs as at least one candidate SCC according to the channel status parameters;
 (d) determining a subset of the at least one candidate SCC as at least one available SCC by performing CCA for each of the at least one candidate SCC according to the first order, wherein the candidate SCC with a higher priority level according to the first order requires a fewer number of times of successfully performed CCA to become one of the at least one available SCC; and
 (e) allocating the at least one available SCC to at least one of the UEs.

10. The channel selection method of claim 9, further comprising:
 receiving a plurality of user weights, wherein each of the user weights corresponds to one of the UEs;
 sorting the UEs according to the user weights so that the UEs have a second order; and
 allocating the at least one available SCC according to the second order.

11. The channel selection method of claim 9, wherein the number of times that the CCA is performed for each of the at least one candidate SCC in the step (d) is not all the same.

12. The channel selection method of claim 9, wherein a start time for performing CCA for each of the at least one candidate SCC in the step (d) is not all the same.

13. The channel selection method of claim 9, wherein a narrow band defines a plurality of time intervals, each of the time intervals corresponds to one of the at least one candidate SCC, and during each of the time intervals, the step (d) perform the CCA for the candidate SCC corresponding to the time interval.

14. The channel selection method of claim 13, further comprising:
 transmitting a correspondence relationship between the time intervals and the at least one candidate SCC to each of the UEs;
 transmitting, for each of the at least one available SCC, a busy tone during the time interval corresponding to the available SCC; and
 transmitting a reservation signal on each of the at least one available SCC.

15. The channel selection method of claim 9, wherein the at least one available SCC includes a first available SCC and a second available SCC, the first available SCC is a second LTE band, the second available SCC is not an LTE band, each of the UEs has a connection with the base station, each of the connections has a QCI, the QCI of a first connection among the connections is higher than the QCIs of other connections, the QCI of a second connection among the connections is lower than the QCIs of other connections, the channel selection method further comprising:
 allocating the first available SCC to the first connection;
 notifying the UE corresponding to the first connection to use the first available SCC;
 allocating the second available SCC to the second connection; and
 notifying the UE corresponding to the second connection to use the second available SCC.

16. The channel selection method of claim 9, wherein the at least one available SCC includes a first available SCC and a second available SCC, the first available SCC and the second available SCC are not LTE bands, the first available SCC has a priority level higher than that of the second available SCC, each of the UEs has a user weight, the user weight of a first UE among the UEs is higher than other user weights, the user weight of a second UE among the UEs is lower than other user weights, the channel selection method further comprising:
 allocating the first available SCC to the first UE;
 notifying the first UE to use the first available SCC;
 allocating the second available SCC to the second UE; and
 notifying the second UE to use the second available SCC.

* * * * *